THREE-LEVEL ASYNCHRONOUS SWITCHING CIRCUIT

Filed Dec. 22, 1961

INVENTOR
JAMES L. WALSH

BY George O. Saile
ATTORNEY

United States Patent Office 3,156,830
Patented Nov. 10, 1964

3,156,830
THREE-LEVEL ASYNCHRONOUS SWITCHING CIRCUIT

James L. Walsh, Hyde Park, N.Y., assignor to International Business Machines Corporation, New York, N.Y., a corporation of New York Filed Dec. 22, 1961, Ser. No. 161,643
5 Claims. (Cl. 307—88.5)

This invention relates to a transistor switching circuit and in particular to an asynchronous current switching circuit having three-level logic.

Asynchronous logic requires that a zero be distinguished from nothing. In the usual two-level system, the outputs of any particular computer unit can be sensed to determine whether they have changed from the first level to the second level. If a change from the first level to the second level is not detected in all of the outputs, it may be that either the result of the operation performed is such that some of the outputs should remain at the first level or that the operation within the unit is not completed. It, therefore, cannot be positively determined whether the operation within the unit is, in fact, completed. In the three-level system, the first level and the third level are assigned as information levels and the second level is assigned as the non-information level. The operation is determined as complete when all of the outputs from the computer unit are no longer at the non-information level. Further operations in the computer can, at this time, be immediately initiated.

It is an object of this invention to provide a new three-level asynchronous transistor switching circuit.

It is a further object of this invention to provide an asynchronous transistor switching circuit capable of providing three signal levels at normal and complementary outputs.

These and other objects are accomplished in accordance with the broad aspects of the present invention by providing a pair of like transistors which are each biased from respective current sources. A means is provided for connecting the emitters of the pair of transistors and for connecting the current sources coupled to the pair of transistors. When a ground signal is applied to the input circuit, the biasing current is caused to flow in both transistors and a single unit of current appears in the output circuit associated with each of the transistors. A positive signal applied to the input circuit turns off the first transistor and current from its biasing current source flows through the means for connecting the emitters of the transistors and connecting the current sources where it combines with the biasing current of the other transistor to provide an output at the second level. The output circuit associated with the first transistor will provide a signal which is the complement of the output signal of the second transistor and, in this case, the output is no current or a reference level. A negative input signal turns on the first transistor which shunts the current from the second transistor through the means for connecting the emitters of the transistors and connecting the current sources causing turn-off of the second transistor. The shunted current combines with the biasing current of the first transistor to flow out of the first transistor giving an output of the second level. No current or a reference level appears in the output circuit of the second transistor. Thus, the novel switching circuit has three stable output levels represented by two, zero and one units of current and two outputs which are the complement of one another.

The foregoing and other objects, features and advantages of the invention will be apparent from the following more particular description of a preferred embodiment of the invention, as illustrated in the accompanying drawings.

Figures 1, 2, 3:
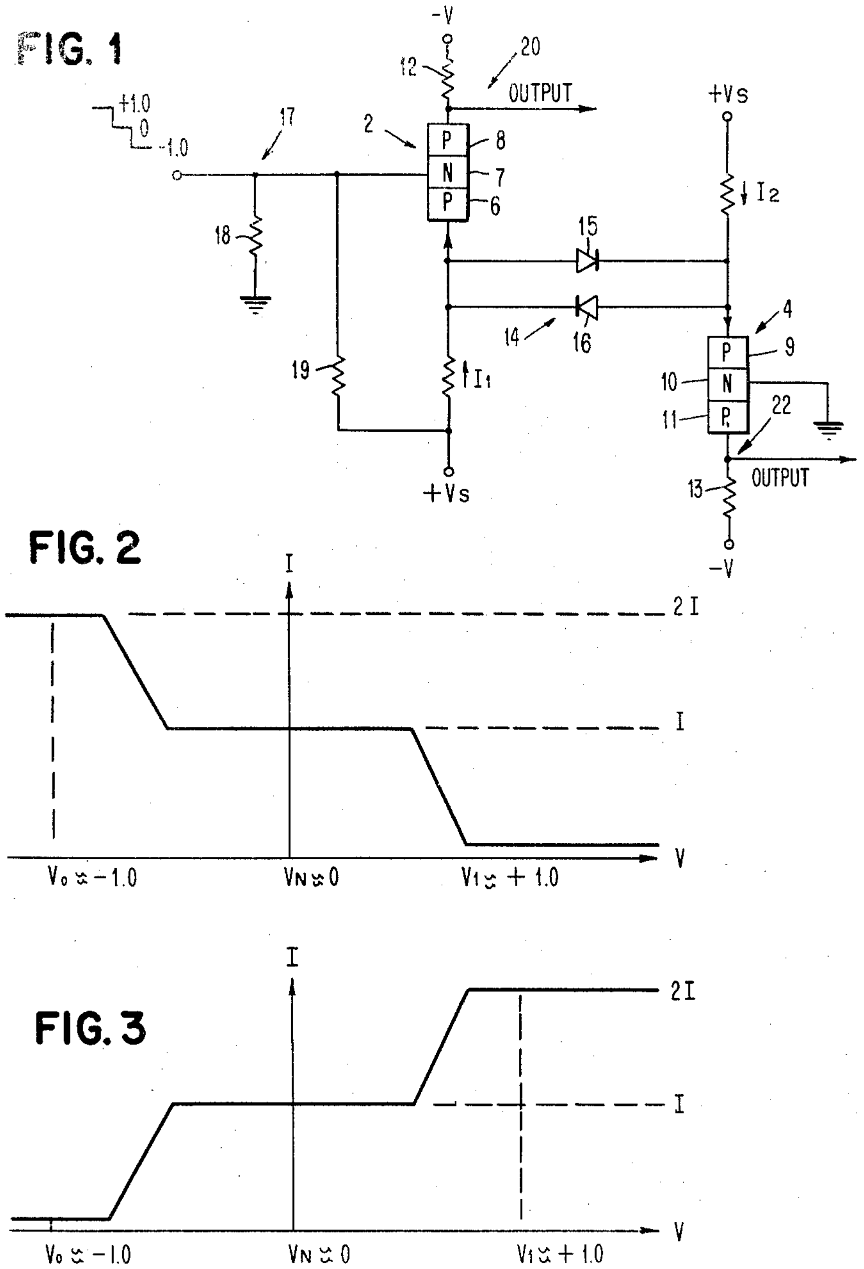
FIG. 1 is a transistor three-level asynchronous switching circuit illustrating the principles of this invention.
FIG. 2 is a graphical illustration of how input signals change the current level output in the output circuit associated with the first transistor; and, FIG. 3 is a graphical illustration of how input signals change the current level output in the output circuit associated with the second transistor.

Referring now to FIG. 1, a transistor circuit is shown illustrating the basic principle of the asynchronous switching circuit of the present invention. The circuit includes a pair of like transistors 2 and 4, each of which is biased from their respective constant current sources $V_S$. The first PNP junction transistor 2 having an emitter 6, a base 7 and a collector 8 is connected in a common emitter configuration. The second PNP junction transistor having an emitter 9, a base 10 and a collector 11 is connected in a common base configuration. The base 10 of the second transistor is connected to a source of reference potential. Sources of negative potential $-V$ are connected to the collectors of the pair of transistors through resistors 12 and 13. Means 14 are provided for connecting the emitters of the pair of transistors and for connecting the constant current sources $V_S$. This connecting means may include a pair of unilaterally conducting devices connected in parallel opposed conducting relation such as a pair of diodes 15 and 16 or their electrical equivalent. An example of the electrical equivalent of the unilaterally conducting devices is a single "backward" diode or tunnel rectifier (not shown). An input circuit 17, which includes resistors 18 and 19, applies the input signal to the base of the first transistor 2. There are two outputs present in the switching circuit of the invention, one of which may be considered a normal output and the other a complementary output. A first output circuit 20 is connected to the collector 8 of the first transistor, while a second output circuit 22 is connected to the collector 11 of the second transistor.

The operation of the switching circuit may readily be understood with reference to the FIGURES 1, 2 and 3 of the drawing. Transistors are so biased that when there is an input of zero volts, the biasing currents $I_1$, $I_2$ flow into transistors 2 and 4 respectively. A single unit or level of current appears in each of the output circuits 20 and 22. If a $-1.0$ voltage signal appears in the input circuit, the common emitter transistor 2 will conduct and the current $I_2$ is shunted from the common base transistor 4 through the diode 16. This causes the turn-off of the common base transistor 4. A zero unit or level of current then appears at the second output circuit 22 as shown in FIGURE 3. At the first output circuit, there are two units of current present as indicated in FIGURE 2. The application of a $+1.0$ voltage to the input circuit turns off the transistor 2. The current $I_1$ flows through diode 15 and combines with biasing current $I_2$ and flows into transistor 4. In this situation, it is seen from FIGURES 2 and 3 that the first output circuit 20 has a zero unit of current present and the second output circuit 22 has two units of current present. The current levels can be converted to suitable voltage levels by choice of an appropriate load resistor.

While the transistors in the circuit illustrated are PNP transistors, it will be readily understood that NPN transistors can be used alternately providing that all polarities of the potential sources are reversed and other changes made in accordance with principles well understood in the art.

The circuit shown has three stable levels represented by two, zero and one units of current and all the attractive logical features of the regular two valued current switching circuit. The first level and the third level may now be assigned as information levels and the second level assigned as the non-information level. The present switching circuit satisfies the requirement of asynchronous logic that zero must be distinguished from nothing.

While the invention has been particularly shown and described with reference to a preferred embodiment thereof, it will be understood by those skilled in the art that various changes in form and details may be made therein without departing from the spirit and scope of the invention.

What is claimed is:

1. A current switching circuit having at least three different stable outputs comprising: a pair of like transistors each having an emitter, a collector and a base; each of said transistors being biased from a constant current source; a pair of unilaterally conducting devices connected in parallel opposed conducting relation and interconnecting the emitter electrodes of the said transistors; said devices being also connected between the said current sources coupled to the said transistors; an input circuit connected to the base of one of the said pair of transistors; the base of the other of said pair of transistors being connected to a source of reference potential; a normal output circuit connected to the collector of one of the said pair of transistors; and a complementary output circuit connected to the collector of the other of the said pair of transistors; whereby positive, ground and negative input signals cause a normal output of two, one and zero, and a complementary output of zero, one and two.

2. A current switching circuit having at least three different stable outputs comprising: a pair of like transistors each having an emitter, a collector and a base; a constant current source associated with each of said transistors for biasing the respective transistors; a pair of diodes connected in parallel opposed conducting relation; means for connecting the emitters of the said transistors through said pair of diodes; means for connecting said constant current sources through said pair of diodes; an input circuit connected to the base of one of the said pair of transistors; the base of the other of said pair of transistors being connected to a source of reference potential; a normal output circuit connected to the collector of one of the said pair of transistors; and a complementary output circuit connected to the collector of the other of the said pair of transistors; whereby positive, ground and negative input signals cause a normal output of two, one and zero, and a complementary output of zero, one and two.

3. A current switching circuit having at least three different stable outputs comprising: a first and a second transistor each having an emitter, a collector and a base; a constant current source connected to the said emitter of each transistor for biasing the same; a pair of diodes connected in parallel opposed conducting relation; means for connecting the emitters of the said transistors through said pair of diodes connected in parallel; means for connecting said constant current sources through said pair of diodes; an input circuit connected to the base of the said first transistor; the base of the other of said pair of transistors being connected to a source of reference potential; a normal output circuit connected to the collector of said second transistor and a complementary output circuit connected to the collector of said first transistor; whereby positive, ground and negative input signals cause a normal output of two, one and zero, and a complementary output of zero, one and two.

4. A current switching circuit having at least three different stable outputs comprising: a pair of transistors each having an emitter, a collector and a base; each of said transistors being biased from a separate constant current source; means capable of unilaterally conducting current above a threshold value in either of two directions; means connecting the emitters of said transistors through said means capable for conducting; means connecting the separate current sources associated with said transistors through said means capable for conducting; an input circuit connected to the base of one of the said pair of transistors; the base of the other of said pair of transistors being connected to a source of reference potential; and a separate output circuit connected to each of the collectors of the said pair of transistors; whereby positive, negative and ground input signals cause two, zero and one levels of current to be in the output circuits.

5. A current switching circuit having at least three different stable outputs comprising: a pair of like transistors each having an emitter, a collector and a base; a separate constant current source connected to the said emitter of each transistor for biasing the same; means capable of unilaterally conducting current above a threshold value in either of two directions; means connecting the emitters of said transistors through said means capable for conducting; means connecting the separate current sources associated with said transistors through said means capable for conducting; an input circuit connected to the base of one of the said pair of transistors; the base of the other of said pair of transistors being connected to a source of reference potential; a normal output circuit connected to the collector of one of the said pair of transistors and a complementary output circuit connected to the collector of the other of the said pair of transistors; whereby positive, ground and negative input signals cause a normal output of two, one and zero, and a complementary output of zero, one and two.

References Cited in the file of this patent

UNITED STATES PATENTS

| | | |
|---|---|---|
| 2,972,060 | Torrey | Feb. 14, 1961 |
| 3,060,330 | Trampel | Oct. 23, 1962 |

OTHER REFERENCES

"Current Switching Inverter," by Gruodis in IBM Tech. Disclosure Bulletin, vol. 4, No. 1, June 1961, pages 34 and 35.

"Inverter With Override," by Bardell et al. in IBM Technical Disclosure Bulletin, vol. 4, No. 6, dated November 1961.

"Three-Level Inverter Using a Two-Emitter Transistor," by Bardell et al. in IBM Tech. Disclosure Bulletin, vol. 4, No. 3, dated August 1961.